(12) United States Patent
Brent

(10) Patent No.: US 10,846,950 B2
(45) Date of Patent: Nov. 24, 2020

(54) SINGLE-CLICK SYSTEM FOR MOBILE ENVIRONMENT AWARENESS, PERFORMANCE STATUS, AND TELEMETRY FOR CENTRAL STATION DEPOSITORY AND MONITORING

(71) Applicant: Kevin G. D. Brent, Memphis, TN (US)

(72) Inventor: Kevin G. D. Brent, Memphis, TN (US)

( * ) Notice: Subject to any disclaimer, the term of this patent is extended or adjusted under 35 U.S.C. 154(b) by 0 days.

(21) Appl. No.: 16/033,194

(22) Filed: Jul. 11, 2018

(65) Prior Publication Data

US 2019/0019353 A1 Jan. 17, 2019

Related U.S. Application Data

(60) Provisional application No. 62/604,546, filed on Jul. 11, 2017.

(51) Int. Cl.
| | |
|---|---|
| *G07C 5/06* | (2006.01) |
| *G07C 5/00* | (2006.01) |
| *H04N 13/189* | (2018.01) |
| *H04N 13/282* | (2018.01) |
| *G07C 5/08* | (2006.01) |

(52) U.S. Cl.
CPC .............. *G07C 5/06* (2013.01); *G07C 5/008* (2013.01); *G07C 5/0816* (2013.01); *H04N 13/189* (2018.05); *H04N 13/282* (2018.05)

(58) Field of Classification Search
CPC ........ G07C 5/06; G07C 5/008; H04N 13/189; H04N 13/282
See application file for complete search history.

(56) References Cited

U.S. PATENT DOCUMENTS

| | | | | |
|---|---|---|---|---|
| 2002/0003571 | A1* | 1/2002 | Schofield | B60C 23/00 348/148 |
| 2005/0099498 | A1* | 5/2005 | Lao | H04N 5/765 348/207.99 |
| 2009/0153312 | A1* | 6/2009 | Tanaka | B60Q 9/00 340/426.1 |
| 2010/0225738 | A1* | 9/2010 | Webster | B60R 11/04 348/36 |
| 2014/0139655 | A1* | 5/2014 | Mimar | G08B 21/0476 348/77 |
| 2016/0311401 | A1* | 10/2016 | Altawil | B60R 25/305 |
| 2017/0148237 | A1* | 5/2017 | Iwaasa | B60W 50/08 |
| 2017/0247000 | A1* | 8/2017 | Ricci | G06K 9/00302 |
| 2017/0279957 | A1* | 9/2017 | Abramson et al. | H04M 1/6075 |

(Continued)

*Primary Examiner* — Mishawn N. Hunter
(74) *Attorney, Agent, or Firm* — William S. Parks

(57) ABSTRACT

An all-encompassing system for a mobile vehicle that contributes to an overall monitoring and diagnostic function for a plurality of vehicles, as well, is provided. In other words, such a base system for a single vehicle accords access to analyze and monitor conditions and statuses for not only a single vehicle, but a plethora thereof simultaneously, ostensibly to permit both the ability for a driver (or passenger) to monitor the individual vehicle as well as a central station to monitor such a single vehicle, as well as many others within the same system. Thus, the single vehicle system is employed individually within other vehicles, if desired, for a fleet monitoring capability. Alternatively, such a system may be limited to a single vehicle for an individual person (or persons) to monitor situations for the sole vehicle while in use or while parked.

11 Claims, 2 Drawing Sheets

(56) References Cited

U.S. PATENT DOCUMENTS

2017/0291540 A1* 10/2017 Caveney ................ B60Q 5/005
2017/0306862 A1* 10/2017 Waite, III ............. F02D 31/001
2018/0053415 A1*  2/2018 Krunic ............. G08G 1/096775

* cited by examiner

SINGLE-CLICK SYSTEM FOR MOBILE ENVIRONMENT AWARENESS, PERFORMANCE STATUS, AND TELEMETRY FOR CENTRAL STATION DEPOSITORY AND MONITORING

CROSS-REFERENCE TO RELATED APPLICATION

This application claims priority from U.S. Provisional Patent Application Ser. No. 62/604,546, filed on Jul. 11, 2017, the entirety thereof being incorporated herein by reference.

FIELD OF THE INVENTION

The present invention relates to an all-encompassing system for a mobile vehicle that contributes to an overall monitoring and diagnostic function for a plurality of vehicles, as well. In other words, such a base system for a single vehicle accords access to analyze and monitor conditions and statuses for not only a single vehicle, but a plethora thereof simultaneously, ostensibly to permit both the ability for a driver (or passenger) to monitor the individual vehicle as well as a central station to monitor such a single vehicle, as well as many others within the same system. Thus, the single vehicle system is employed individually within other vehicles, if desired, for a fleet monitoring capability. Alternatively, such a system may be limited to a single vehicle for an individual person (or persons) to monitor situations for the sole vehicle while in use or while parked. Thus, the system relies upon the initial individual capacity of a single-clock operation to monitor multiple criteria and variables with display capability for each component for the user/driver/passenger to easily review and/or monitor the status thereof. To that extent, the individual vehicle system employs camera components for 360 degrees coverage of the external portions of the vehicle. These viewpoints accord a safety aspect while parked and a mobile safety review capability while in motion. Likewise, the system includes telematics in relation to a variety of measures for the performance of the vehicle, more so than just odometer, tachometer, and speedometer measurements. As for the camera viewing, such results are placed in the viewing area for the user/driver/passenger to facilitate monitoring thereof during operation or while idle. A global positioning system (GPS) component provides locational monitoring and couples within the notification system with the central station for system-wide monitoring purposes. An accelerometer is incorporated to determine orientation and behavior of the vehicle also.

BACKGROUND OF THE PRIOR ART

Automated vehicles have been utilized for over a century for transport purposes, whether for people, individuals or groups, or goods (from animals to bulk items). The need to ensure proper and continued performance thereof has long been a necessity, whether in terms of individual vehicles or fleets of transport devices. Internal measures and gauges have long been utilized to indicate engine and oil temperature, fuel levels, even battery and possibly alternator effectiveness. Additionally, there has long been a need to facilitate a driver's capabilities of noticing traffic sharing the road (particularly vehicles on either side thereof, such as within typical "blindspots"). As well, there exists, on occasion, the potential need to provide awareness of conditions external such a vehicle while parked (again, such as in "blind spots" around the perimeter). Furthermore, there are instances where automated locating of such a vehicle (by a separate entity, whether another person or a central server/monitoring station) is desirable. In any event, such information provided in total and on demand has yet to be provided the vehicle industry. Additionally, the ability to do so with instantly reviewable data for the user/driver/passenger or a central depository, for that matter, and within a recordable medium with reliable playback capability, again, in total and on demand, in addition to that above-noted possibilities, has also yet to be accorded the pertinent industry. Even further of interest would be the ability for such an overall system to activate upon ignition of the vehicle (e.g., starting the engine) or otherwise on demand while parked and idling or actually turned off. Such a system, again, has yet to find disclosure and/or fair suggestion within the prior art. Thus, such a system, whether for an individual vehicle or combined for central monitoring of a fleet of vehicles has yet to be provided in the pertinent art. Furthermore, the ability to provide a single activation display of all such information for viewing and review by the user/driver/passenger has not been disclosed or considered within the vehicle industry, either. The following disclosure remedies such a shortcoming.

ADVANTAGES AND SUMMARY OF THE INVENTION

One distinct advantage of the present disclosure is the ability to provide an entire status and situational monitoring capability for an individual vehicle as it concerns perspective views around the external portion thereof as well as a variety of different analytical devices. Another advantage is the ability to provide such monitoring capability to a central station for immediate analysis from a distance for reporting purposes as well as surveillance and notification of the individual vehicle instantaneously. Additionally, the disclosure provides a manner of providing instant information of analytical data to the user/driver/passenger to allow for proper responses and actions taken in relation thereto.

Accordingly, this invention encompasses a mobile device monitoring system comprising: a) a mobile device; b) at least one externally positioned and mounted camera wherein said all such camera components present provide 360 degrees video views of the external portions of said vehicle; c) a global positioning system component; d) a plurality of contact sensors for measuring metrics for vehicle status concerns; e) at least one digital recorder component connected with said at least one externally positioned and mounted camera; f) at least one engine control unit microprocessor (ECU) to which a plurality of sensors are connected measuring levels of performance of device operations and providing constant sensor information to said ECU during device operation, wherein said ECU includes at least one algorithm to convert said sensor information from said digital recorder to said readable format for placement on said display, wherein said algorithm includes software that provides analytical review of such information prior to conversion to said readable format; g) a power supply; h) a wired connection from said power supply to the digital recorder that activates upon operation of the vehicle ignition; i) at least one Wi-Fi antenna component, and j) at least one video display viewable by said user/driver/passenger for providing video information from said at least one digital recorder component and said sensor information in readable format from said ECU. Such a system provides the further capability of allowing for notification from a central depository station (network capability, for instance) upon receipt and review of such continuously streamed information regarding the video external views, global positioning and movement, as well as the sensor components in order to allow for instant warning of trouble or other like situation (whether while driving or idle or parked). The overall system, particularly the digital recorder and the information sent via Wi-Fi to a central depository station (if utilized and present, of course), further allows for post-operation analysis and playback of recorded data and video as needed for improvements/repairs/etc., to be undertaken. In this sense, then, such an overall system ultimately provides a full monitoring and surveillance capability methodology and platform that provides a complete and continuous status update as well as immediate up-to-date protective operation for a driver, passenger, fleet owner, to utilize as needed for such purposes. In other words, this system allows for a single source review monitor within the confines of the subject vehicle for complete video review of the external portions thereof as well as internal sensors to determine the working conditions of the vehicle itself and to determine through analytics its optimum performance level with any number of sensors employed for such concerns. The mobile device (or VED) in relation to this disclosure may be anything that provides movement via mechanical, hydraulic, or electrical, means, including, without limitation, cars (including, for example, and without limitation, passenger cars, minivans, courier vehicles, taxis, and the like), trucks (including, without limitation, semis, armored trucks, and the like), buses, ambulances, motorcycles, mopeds, tripeds, quads, agricultural vehicles, agricultural devices, construction devices, construction vehicles, marine devices, and marine vehicles (and any other type of vehicle or device that, again, exhibits movement that can be measured and assessed for performance and also includes an external and internal portion that requires surveillance for protective purposes).

The overall system is a solution which addresses mobile asset awareness challenges with four required components, as well as capably including several other modular add-ons. The base components are, as noted above, 360 degree video, full telematics from the vehicle's on-board computer, vehicle location/speed/behavior, and comprehensive reporting (and notification, if needed). The disclosed system may be utilized and enabled on any vehicle, equipment, or device (VED) that moves by either mechanical, electrical or hydraulic means (and thus the terms "vehicle" herein is intended to include such equipment and device meeting such a broad definition in addition to automated mobile vehicles). As further alluded to above, the disclosed system may be utilized as a stand-alone system, capable of operating independently of the power source of the enabled VED, or as a part of the vehicle's infrastructure, being powered by the VED's power source itself, as well as part of an overall network with groups of other VEDs of like set up.

This disclosed system thus also comprises a combination of commercial off-the-shelf (COTS) software, specifically developed software, and explicitly designed hardware and custom and ad hoc reporting features. The disclosed system is created by integrating specific components together to provide a complete awareness of the environment of a vehicle, equipment or device. The system provides total awareness of the interior, exterior, operational, and behavioral conditions of the vehicle, as a result, with immediate and continuous presentation of such conditions and information to the user/driver/passenger, as well as, if desired, transmission of such data to a central network station for compilation, analysis, and possible notification of such surveilled operations. In addition, the system provides and maintains an informational log of the history of the vehicle, equipment, or device, for all of these data points.

The hardware utilized to accomplish the Mobile Environment Awareness is key to the success. The equipment is ruggedized, hardened, specially designed, engineered and manufactured to be utilized in harsh environments, while still providing a reliable computing system in a mobile environment. The hardware consists of a Mobile Video Recorder (MVR) (referred herein also as a digital video recorder) which has state of the art components and is ruggedized. The MVR captures, collects and stores the data provided by an On-Board Diagnostic device (a standard component of certain vehicles for diagnosing certain vehicle part conditions), an OBD II device, a GPS tracker, a gyroscope/accelerometer, and cameras. The MVR also does the processing of the data collected, performing any analysis and calculations necessary for useful consumption and analysis. The MVR also has remote access capability, via different methods, including, but not limited to, 3/4G, WiFi, Bluetooth, USB and other cable type connections and software applications.

The OBD II and OBD devices allow for connectivity to the ECU/ECM (Engine Control Unit/Module). These devices provide the PIDs (Parameter IDs) to be read from the ECU/M, analyzed, translated and presented in plain English (or the appropriate language). In some instances, the OBD II and OBD may also provide additional information, such as GPS, behavior and condition. In the instances where these devices provide this information, there will not be a need to have the other equipment available.

The GPS tracker provides location, direction and speed of the VED. In some instances, the GPS tracker also provides additional information, such as behavior and condition. The Gyroscope/Accelerometer provides orientation, direction, behavior and characteristics of the vehicle, equipment or device. It measures power, pressure and other metrics which show characteristics of the VED at all time of operation. In some instances, the gyroscope/accelerometer will provide additional information as well.

The reporting is accomplished by utilizing the collected data and running queries against the data stored in the MVR. In the event that a fleet data aggregation is needed, the data can be collected in a single repository and reports run against the collected data.

With these four base subsystems, and the components noted above, the overall disclosure provides awareness of the environment of any implemented mobile vehicle, equipment or device with the user/driver/passenger accorded a full, objective, and accurate assessment of the environment of their mobile device with further display of formatted data information on demand and notification and alarm of any problems/issues in relation to performance, behavior, or other type of situation. As noted above, these benefits, heretofore not provided within the prior art or the industry as of today, encompass full environment awareness through i) 360-degree recorded video for a no-blind-spot visual perspectives and views, ii) full-scale telematics directly from the Engine Control Unit/Module (ECU/ECM) of the vehicle, iii) location, speed and operational behavior of the vehicle at all times (through GPS, gyroscope, and accelerometer, at least, components), and iv) extensive reporting, both automated and ad hoc, through direct display within the VED to the user/driver/passenger or via network transmission through Wi-Fi signals from the VED to a central repository/depository for compilation, analysis, and notification/alarm of situations continuously and immediately, as needed. These four base components comprise the solution which sets us apart from all others. In addition, there are subcomponents within the different base components. They are listed within the areas as follows:

a. The 360-degree video allows for different types of video formats including; but not limited to, panoramic, panamorph, fish-eye, focused. The video will be stored on the in-vehicle Mobile Video Recorder (MVR), which has WiFi, Bluetooth and other network capabilities. The video can be accessed in real time or replayed at a later time after recording it.

b. Telematics allow the data from the vehicle to be accessed, processed, and interpreted in plain language for the benefit of the user. The data can be captured via different methods, including WiFi, Bluetooth, USB or other cable connection, or direct connect to the ECU/ECM. The telematics can be standard or specific/particular (tailored).

c. Location, speed, compliance, and behavior allows the administrator/manager to know at all times the location, position, and operational behavior of their vehicle, equipment or device. This includes the pin point location of the device, such as within three (3) meters or less, as well as the speed, direction, altitude, relative temperature, barometric pressure, etc., of the VED at that moment. Every data element that is obtainable from the ECU/ECM can be provided through the designated communications means.

d. Reporting provides the ability to automate an array of pre-scripted and ad hoc reports. The user can delve deeper into the reports to perform many facets of data analysis. These reports can be provided at automated times through a display to the user/driver/passenger, or upon request through the same type of display. The data history may also be kept and reviewed on demand, as well.

All of these components are available, as noted above, on one display screen, allowing for quick-glance awareness by the user/driver/passenger. The screen allows for access to each component individually or collectively. With one touch, the user can replay specific time frames of activity in video; telematics information, and location; speed, compliance and behavior. Likewise, with a mobile vehicle, such a display may provide views of the exterior of the vehicle to the driver to show if any other vehicles are present within a blind spot to accord much safer driving capabilities. With vehicles such as, for instance, semis (18-wheeler trucks), such a blind spot capability is quite important to improve safety measures, clearly.

Additionally, heat sensing radar or other type of perimeter radar may also be employed, particularly if the device/vehicle is one that is needing extra protections. Such components allow for extra levels of security through infrared and sound, at least, sensor technology.

This collective and simultaneous replay provides an accurate review of the important sequence of the event, incident, and/or activity. The system provides the capability to drill down to more advanced or specific functions, including, but not limited to, reporting, graphing, aggregation, etc. The system has an administration component which gives user privileges for configuring, editing, user and authority administration, etc.

The specific hardware for the solution consists of a Mobile Video Recorder (MVR), cameras, GPS/Accelerometer/Gyroscope/Tracking equipment, a powerful high-speed computer processor, cabling, power supply, wiring, and installation components for the various type vehicles, equipment and/or device.

As it pertains to all externally located devices, such are provided, as noted previously, with suitable materials to accord rugged, strong, and difficult to mar or break articles. Thus, the utilization of extremely strong metals for the housing thereof as well as strong plastic and/or glass lenses are potentially preferred for this purpose (such as, without limitation, thick gauge steel and heavy duty transparent lens covers). Any cords utilized externally for electrical purposes are likewise provided with very strong cables to protect from breakage should a wreck or like situation occur. Such strong materials and devices allow for the necessity for such a camera(s) to function properly under myriad conditions (environmental or physical, at least) without fear of losing such capabilities. The lens/lenses involved are also provided with any type of digital viewing capability, for instance, flat, panorama, fish-eye, and the like, focal points. Such focal points and lengths, for that matter, may be modified as desired by the user/driver/passenger to provide suitable views, too. The camera/cameras provide a high definition (if desired) 360 degrees external view of the subject vehicle continuously in order to, as noted above, allow for full monitoring of the vehicle external locations whether in motion or at rest (to protect, again, against drivers in "blind spots" or potential bad actors, and the like, hiding outside the vehicle in close proximity thereto). The camera/cameras are connected with the digital recorder for analysis of the images, transfer to the central depository station (if present) via the Wi-Fi antenna (or possibly Bluetooth capability, or other broadband capacity), and presentation to the user/driver/passenger as needed within the display accessible by such a person.

The MVR/digital recorder is, as its name implies, a recording device to receive and store camera video images and films; such is thus stored for further access upon demand for review thereof and/or may be relayed continuously to the display component for immediate review by the user/driver/passenger as needed. Such a component has a rather high volume internal storage capability (256 gigabyte, for instance) to allow for recording and storage of significant amounts of data and videos. Other internal components of the MVR include an accelerometer to determine velocity (in addition to the speedometer of the vehicle itself), a gyroscope to determine orientation of the vehicle (and thus to assess control and vehicle behavior during operation), temperature gauges for interior and exterior measures (and suitable connections for both), Bluetooth connections for external components such as a computer keyboard, a mouse, even the on-board diagnostic II protocol, at least one high-speed processor (high capacity/high performance, as needed) to effect increased speed and operational capability of the MVR), a Wi-Fi connection for data transmission, and a 3G/4G transmission capability for broadband connectivity purposes.

The overall system also plugs into the VED ECU to access the functions and reporting capabilities of such an embedded process. To that end, the overall system thus has access to and provides reporting capabilities (not just warnings, but actual on-the-fly measurements) of the sensors accorded therein such provided ECU connections. Thus, for instance, such sensors may provide up-to-date information regarding interior (vehicle) temperature, oil temperature, coolant temperature, exterior temperature, oxygen levels (interior), engine oxygen levels (for fuel mixing and consumption), brake levels, tire levels, airbag status (pressures, armed states, etc.), and the like. These activities may be provided through telematics to the overall system, thus allowing for any information that may be transmitted by and through the ECU to be translated and reported in various and different formats, including, without limitation, graphs, numbers, lines, charts, and the like. As alluded to previously, as well, such data may be utilized to run historical reports to review VED performance and possibly work to optimize conditions for improvements thereof. Contact sensors may further be utilized to manipulate and/or determine the state of other vehicle components, if desired, including the door lock, fuel kill, camera activation, and the like. Additionally, there may be a further camera or cameras placed within the internal of the subject vehicle to monitor the driver visually for certain effects, as well. In any event, the digital recorder provides a number of beneficial measurements and viewpoints to allow for continued assessment of the vehicle condition as well as the driver (or possibly any other passenger) condition (particularly to assess any impairments. The relation to the time of ignition to any such impairment assessment(s) also allows for the potentially to determine if such driver condition is due to long distance driving, as well. Of course, the GPS locator component and other sensors can provide a full analytical assessment otherwise as to driver condition in relation to actual driving times, starts and stops, and distances, thus allowing for full review and even possible notification through an alarm or like device to alert the driver as to any monitored problems. The further ability of the digital recorder to then transmit information to the ECU allows for full analysis of sensor information within the processor via software algorithms to assign a proper analytical value for such data and then transform the same into readable/reviewable format on the driver display unit.

Furthermore, such ECU-relayed data may then be transmitted further via Wi-Fi antenna (at least) to a central station depository (external central location for compilation of such data from a plurality of vehicles with continuous monitoring and surveillance thereof through such a Wi-Fi broadband component. If a significant enough issue or problem is noticed through such a network controller (after compilation, analysis, and ultimately determination of an issue, such as, for instance, apparent erratic driving behavior noted through gyroscopic and/or video surveillance while in operation) the system may immediately contact the user/driver/passenger, such as through SMS, MMS, voice, or email (although while in operation, such notifications would most likely be provided through voice or like sound-based alarm capabilities). Such a system thus utilizes the entirety of the overall capabilities thereof to provide continuous and constant surveillance, whether through the vehicle itself or through a network (for a fleet thereof), to provide such notifications.

Additionally, and importantly, the overall system provides not only surveillance of driving/operating conditions, actions, and other mobile considerations for instant, continuous, and constant review, but it also, as noted above, accords the ability to assess conditions while idling or even while parked, particularly as it concerns external surveillance of the VED itself (for safety purposes, particularly as it concerns potential perpetrators present in proximity to the vehicle itself). The video component(s) thus may function constantly for such viewing and recordation purposes and can alert the user/driver/passenger as to any individuals lurking outside the VED, whether the user/driver/passenger is present within the vehicle or not, and can record the same as needed, as well. The rugged nature of the device(s) accords protection from not only the elements, but possible physical attack, and the system will still record all video data up to the moment such camera components are possibly damaged, removed, and/or destroyed, in any event.

Thus, taking into consideration the overall structural aspects of the physical components, as well as the capabilities of the mechanical components thereof, the overall system accords beneficial results of overall awareness, safety, and upkeep, at least, of a subject VED, as well as the potential to provide a network system to monitor a fleet of like outfitted vehicles, all to a level of surveillance, monitoring, and notification that have heretofore been nonexistent within the industry.

DETAILED DESCRIPTION OF THE DRAWINGS AND PREFERRED EMBODIMENTS

Without any intention of limiting the scope of the inventive system/device/method, the drawings described herein provide but one embodiment herein. Various modifications and different configurations of such a system/device/method may be employed without deviating from the scope and basis of the present invention.

Figure 1:
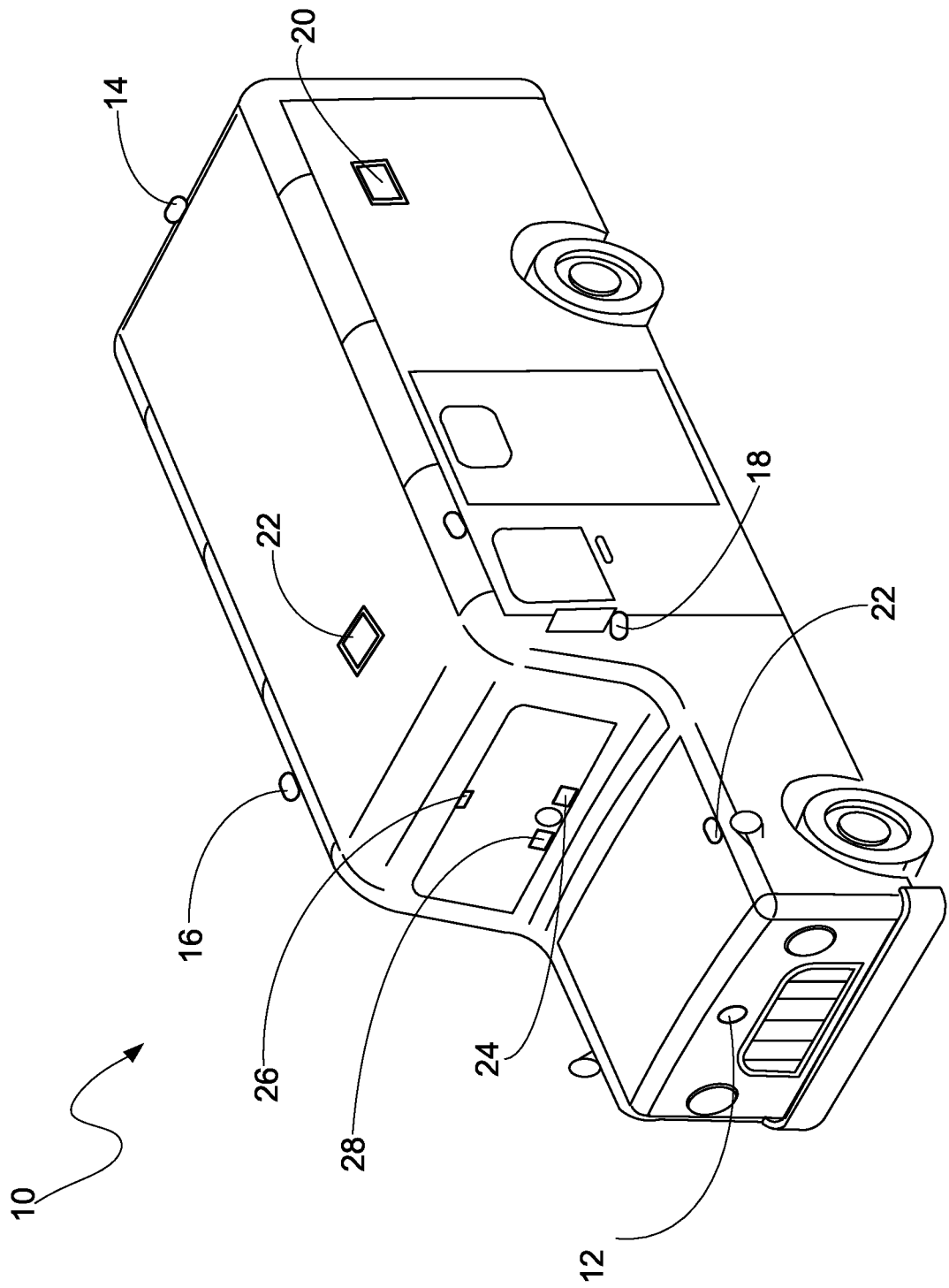
FIG. 1 depicts a perspective partial cut-away view of a potentially preferred embodiment of the incorporation of the disclosed system as it is introduced within a single VED device (here an armored truck).

FIG. 1 shows an armored vehicle device 10 (as one type of myriad devices/vehicles that may be employed within the overall disclosed system) outfitted with the single vehicle components noted above. Such components include an exterior front camera 12 (available from Black Falcon and exhibited rugged structures to withstand impacts and extreme environmental conditions), a rear end radar camera 14 (rugged, as well, and provided, as an example, from Infinite Information, LLC, under the name InifiniteSense) to detect sound and movement at the back of the device/vehicle, a passenger side radar camera 16 (InfiniteSense), a driver side radar camera 17, a thermal (heat-sensing) camera 18 for infrared detection, a stowed system computer 20 (present here at near the rear right portion of the device/vehicle, though it may be located anywhere)(such a computer includes, as examples, a 64-bit embedded CPU with Windows 7 as the operating system to control information receipt and transmission to the display and network and thus also including the Wi-Fi transmission component 136 of FIG. 2), embedded vehicle sensors 22 (here as an array under the hood of the device/vehicle, including the OBD and OBD II components, 132 of FIG. 2, gyroscope, accelerometer, and others, not illustrated), radar LED alarms 24 (to indicate left, right, and rear presence), an interior camera 26, an interior display 28 to provide complete presentation of all collected and analyzed information by the user/driver/passenger on demand and with a single click control (all of the information is displayed through a single action, in other words), and a roof-mounted GPS system 30. Such a system thus accords the driver (not illustrated) complete, protected, and reliable capability of awareness of his or her surroundings, as well as performance measurements and gauges for the device/vehicle itself, and notification capability if any issues arise that jeopardize personal safety and/or performance of the subject device/vehicle.

Figure 2:
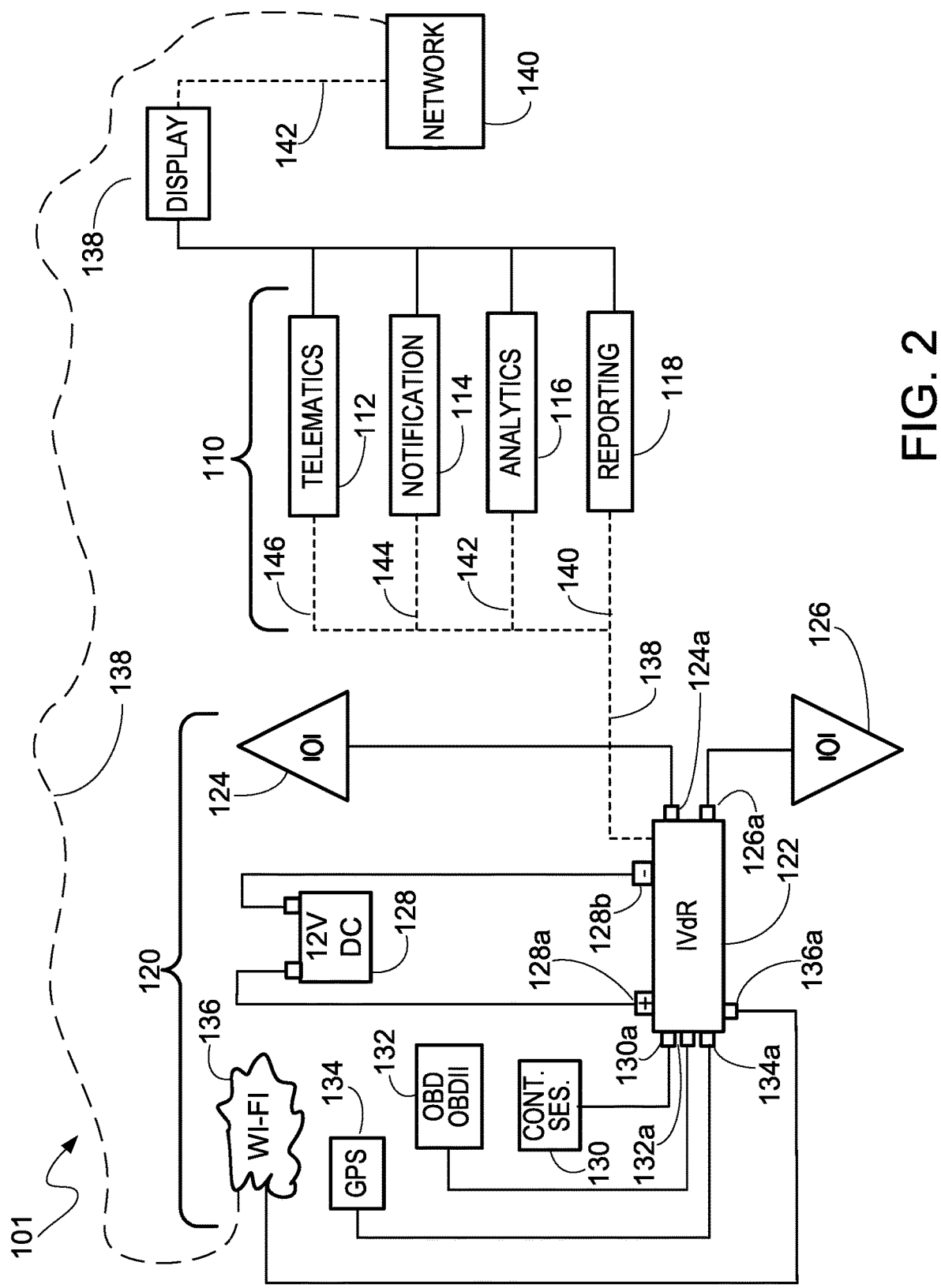
FIG. 2 depicts a diagram of a potentially preferred embodiment of the disclosed system as it is configured within a network for multiple VED surveillance purposes.

FIG. 2 shows a diagram of the internal components of the potentially preferred system 101 including the capability to send to a network 140 for collection of such information from various other devices/vehicles and surveillance and notification to the device/vehicle system 142 at the display 138, as an example, if problems are indicated. The system 101 thus includes the ECU 110 with separate components for telematics 112, notification 114, analytics 116, and reporting 118 of data received from the device/vehicle sensor/video platform 120. The platform 120 includes the digital recorder (here IVdR or MVR) 122 as the central component. To this is connected the power supply 128 at cathode 128*a* and anode 128*b*, the connections 124*a*, 126*a* with the cameras (whether video or radar) 124, 126, the contact sensors within the vehicle 130 and connection therewith 130*a*, the OBD and OBD II components for diagnostics purposes 132 and the connection therewith 132*a*, the GPS system 134 and connection 134*a*, and the Wi-Fi component 136 and connection 136*a*. As collected from all such components, the recorder 122 sends (via Wi-Fi 136 or otherwise) the results to the ECU components 112, 114, 116, 118, through separate transmissions 140, 142, 144, 146, whereupon the results are formatted and analyzed and sent in total and simultaneously to the display 138 for immediate, continuous, and single activation (click) presentation to the driver/user/passenger. At the same time, if a network 140 is present, the Wi-Fi component 136 sends such information thereto for the same type of consideration and compilation, with, as noted above, any anomalies provided 142 the single activation (click) display 138 to notify the driver/user/passenger. In this manner, the overall system accords a heretofore unexplored capability of immediate and complete (and reliable) presentation of displayed information for review and, if necessary, notification (warning, alarm, etc.) to the user/driver/passenger to indicate if any problems exist for immediate correction.

With such an overall system as disclosed herein, and as alluded to above, there is provided a significant improvement in the manner of complete vehicle surveillance and awareness, both internally and externally, for increased safety, improved optimization of performance, and continuous notification of vehicle status. Such considerations accord greater peace of mind, at least, to the user/driver/passenger, whether the VED is a car, truck, bus, agricultural device, construction device, marine vehicle, ambulance, bus, etc., as it concerns not only the safety of the user/driver/passenger, but any persons (or things, for that matter) external such a VED, to protect from unwanted contact (and possible damage to items and death to people), but also the actual performance of the VED itself, allowing proper gauging as to operational capabilities, at least, and even the potential to optimize conditions for maximum efficiency purposes. No such teaching or fair suggestion has been shown within the pertinent art in the past.

Having described the invention in detail it is obvious that one skilled in the art will be able to make variations and modifications thereto without departing from the scope of the present invention. Accordingly, the scope of the present invention should be determined only by the claims appended hereto.

What I claim is:

1. A mobile device monitoring system for a device having a user/driver/passenger, said monitoring system comprising: a) a mobile device; b) at least one externally positioned and mounted camera comprising components providing 360 degrees video views of the external portions of said mobile device; c) a global positioning system component; d) a plurality of contact sensors for measuring metrics and levels of performance of mobile device operations; e) at least one digital recorder component connected with said at least one externally positioned and mounted camera; f) at least one engine control unit microprocessor (ECU) to which said plurality of sensors are connected measuring said metrics and levels of performance of said mobile device operations and providing constant sensor information to said ECU during said mobile device operation; g) a power supply; h) a wired connection from said power supply to said at least one digital recorder component that activates upon operation of said mobile device ignition; i) at least one Wi-Fi antenna component, and j) at least one immediate and continuous video display viewable by said user/driver/passenger for providing video information from said at least one digital recorder component and said sensor information in readable format from said ECU; wherein said ECU converts said sensor information from said at least one digital recorder component to readable format for placement on said display, and wherein said ECU further includes software that provides analytical review of such information prior to conversion to said readable format.

2. The system of claim 1 wherein said mobile device further comprises a notification component for receipt of information, warning, and/or alarm from said ECU and/or said digital video recorder in relation to any conditions that are considered outside parameters.

3. The system of claim 2 wherein said system is connected within a network with a central depository station for compilation, analysis, and determination of said mobile device status in relation to video and/or sensor information transmitted via said Wi-Fi antenna from said mobile device.

4. The system of claim 3 wherein said mobile device is selected from the group consisting of a car, a truck, a bus, an ambulance, a motorcycle, a moped, a triped, a quad, an agricultural vehicle, an agricultural device, a construction device, a construction vehicle, a marine device, and a marine vehicle.

5. The system of claim 3 wherein said network includes a notification component for transmission of information, warning, and or alarm to said mobile device in relation to any conditions determined from said video and/or sensor information transmitted from said mobile device.

6. The system of claim 5 wherein said mobile device is selected from the group consisting of a car, a truck, a bus, an ambulance, a motorcycle, a moped, a triped, a quad, an agricultural vehicle, an agricultural device, a construction device, a construction vehicle, a marine device, and a marine vehicle.

7. The system of claim 2 wherein said mobile device is selected from the group consisting of a car, a truck, a bus, an ambulance, a motorcycle, a moped, a triped, a quad, an agricultural vehicle, an agricultural device, a construction device, a construction vehicle, a marine device, and a marine vehicle.

8. The system of claim 1 wherein said mobile device is selected from the group consisting of a car, a truck, a bus, an ambulance, a motorcycle, a moped, a triped, a quad, an agricultural vehicle, an agricultural device, a construction device, a construction vehicle, a marine device, and a marine vehicle.

9. The system of claim 1 further comprising heat sensing cameras.

10. The system of claim 1 further comprising perimeter components.

11. The system of claim 1 further comprising interior cameras.

* * * * *